US012560530B2

(12) United States Patent
Goddard et al.

(10) Patent No.: US 12,560,530 B2
(45) Date of Patent: Feb. 24, 2026

(54) VISUALIZATION OF SUB-WAVELENGTH FEATURES

(71) Applicant: The Board of Trustees of the University of Illinois, Urbana, IL (US)

(72) Inventors: Lynford L. Goddard, Champaign, IL (US); Jinlong Zhu, Wuhan (CN); Aditi Udupa, Savoy, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 1114 days.

(21) Appl. No.: 17/341,712

(22) Filed: Jun. 8, 2021

(65) Prior Publication Data

US 2021/0384694 A1     Dec. 9, 2021

Related U.S. Application Data

(60) Provisional application No. 63/036,215, filed on Jun. 8, 2020.

(51) Int. Cl.
| | |
|---|---|
| *H01S 3/16* | (2006.01) |
| *G01N 21/25* | (2006.01) |
| *G01N 21/45* | (2006.01) |
| *G01N 21/63* | (2006.01) |
| *H01S 3/10* | (2006.01) |

(52) U.S. Cl.
CPC ........... *G01N 21/255* (2013.01); *G01N 21/45* (2013.01); *G01N 21/63* (2013.01); *H01S 3/10061* (2013.01); *H01S 3/169* (2013.01)

(58) Field of Classification Search
CPC ...... G01N 21/255; G01N 21/45; G01N 21/63; H01S 3/10061; H01S 3/169
See application file for complete search history.

(56) References Cited

U.S. PATENT DOCUMENTS

| | | | |
|---|---|---|---|
| 2017/0212106 A1* | 7/2017 | Linke ............... | G01N 33/54373 |
| 2017/0222724 A1* | 8/2017 | Chang .................... | H04B 10/11 |
| 2018/0221637 A1* | 8/2018 | Jin ......................... | C12M 23/20 |
| 2018/0254611 A1* | 9/2018 | Mayer ................. | H01S 5/18369 |

OTHER PUBLICATIONS

"Anisotropic Resistivity Surfaces Produced in ITO Films by Laser-Induced Nanoscale Self-organization", Carmen et al., Nov. 23, 2020, Advanced Optical Materials.*
"Anisotropic Low Dimensional Materials for Polarization-Sensitive Photodetectors:From Materials to Devices", Jing et al., Jan. 21, 2022, Advanced Optical Material.*

(Continued)

*Primary Examiner* — Hina F Ayub
(74) *Attorney, Agent, or Firm* — Crowell & Moring LLP

(57) ABSTRACT

Objects and/or grouped emitters are anti-symmetrically excited. The anti-symmetric radiation emitted by the objects generate an interference pattern with a node in the spacing between the objects. The spacing may be sub-wavelength and/or below a resolution limit for the emitted radiation. Samples within the spacing may be detected via distortion to the inference pattern and visualized (including sub-resolution limit features) either directly or through reconstruction analysis from the interference pattern.

15 Claims, 5 Drawing Sheets

(56) References Cited

OTHER PUBLICATIONS

Zhou, R. et al., "Detecting 20 nm Wide Defects in Large Area Nanopatterns Using Ogtical Interferometric Microscogy," *Nano Lett.* 13, pp. 3716-3721, 2013.

Barnes et al., "Three-Dimensional Deep Sub-Wavelength Defect Detection Using λ=193 Nm Ogtical Microscogy." Opt. Express 21, pp. 26219-26226, 2013.

Howes et al., "Colloidal Nanoparticles as Advanced Biological Sensors," Science 346, 1247390, 2014.

Xiao et al., "Optical Imaging of Individual Plasmonic Nanoparticles in Biological Samples." *Annu. Rev. Anal. Chem.* 7, pp. 89-111, 2014.

Luchansky et al., "High-Q Optical Sensors for Chemical and Biological Analysis," Analy. Chem. 84, pp. 793-821, 2012.

Zhong et al., "Sensing with Exceptional Surfaces in Order to Combine Sensitivity with Robustness." *Phys. Rev. Lett.* 122, 153902, 2019.

Liu et al., "Nanoantenna-Enhanced Gas Sensing in a Single Tailored Nanofocus," Nat. Mater. 10. pp. 631-636, 2011.

Schmidt et al., "Hybrid Nanoparticle-Microcavity-Based Plasmonic Nanosensors with Improved Detection Resolution and Extended Remote-Sensing Ability," Nat. Commun. 3, 1108, 2012.

Shen et al., "Detection of Single Nanoparticles Using the Dissipative Interaction in a High-Q Microcavity," Phys. Rev. Appl. 5, 024011, 2016.

Zhu et al., "Sensing Sub-10-nm Wide Perturbations in Background Nanopatterns Using Optical Pseudo-Electrodynamics Microscopy," ( OPEM ). *Nano Lett.* 19, pp. 5347-5355, 2019.

Tabata et al., "Antibody-Free Digital Influenza Virus Counting Based on Neuraminidase Activity," Sci. Rep. 9, 1067, 2019.

Hell et al., "Breaking the Diffraction Resolution Limit by Stimulated Emission: Stimulated-Emission-Depletion Fluorescence Microscopy," Opt. Lett. 19, pp. 780-782, 1994.

Rust et al., "Sub-Diffraction-Limit Imaging by Stochastic Optical Reconstruction Microscopy (STORM)," *Nat. Methods* 3, pp. 793-796, 2006.

Hell et al., "Toward Fluorescence Nanoscopy," Nat. Biotech. 21, pp. 1347-1355, 2003.

Hess et al., "Ultra-High Resolution Imaging by Fluorescence Photoactivation Localization Microscopy," *Biophys. J.* 91, pp. 4258-4272, 2006.

Knapper et al., "Chip-Scale Fabrication of High-Q All-Glass Toroidal Microresonators for Single-Particle Label-Free Imaging," Adv. Mater. 28, pp. 2945-2950, 2016.

Knapper et al., "Single-Particle Photothermal Imaging via Inverted Excitation through High-Q All-Glass Toroidal Microresonators," Opt. Express 26, pp. 25020-25030, 2018.

Young, et al., "Interferometric Scattering Microscopy," Annu. Rev. Phys. Chem. 70, pp. 301-322, 2019.

Ortega-Arroyo et al., "Interferometric Scattering Microscopy (ISCAT): New Frontiers in Ultrafast and Ultrasensitive Optical Microscopy," Phys. Chem. Chem. Phys. 14, pp. 15625-15636, 2012.

Taylor et al., "Interferometric Scattering Microscopy Reveals Microsecond Nanoscopic Protein Motion on a Live Cell Membrane," Nat. Photon. 13, pp. 480-487, 2018.

Hong et al., "Background-Free Detection of Single 5 nm Nanoparticles through Interferometric Cross-Polarization Microscopy," Nano Lett. 11, pp. 541-547, 2011.

Miles et al., Sensitivity of Interferometric Cross-Polarization Microscopy for Nanoparticle Detection in the Near-Infrared, ACS Photon 2, pp. 1705-1711, 2015.

Sevenler et al., "Digital Microarrays: Single-Molecule Readout with Interferometric Detection of Plasmonic Nanorod Labels," ACS Nano 12, pp. 5880-5887, 2018.

Chen et al., "Exceptional Points Enhance Sensing in an Optical Microcavity," Nature 548, pp. 192-195, 2017.

Lin et al., "Trapping-Assisted Sensing of Particles and Proteins Using on-Chip Optical Microcavities," ACS Nano 7, pp. 1725-1730. 2013.

Lifante, "Integrated Photonics: Fundamentals," John Wiley & Sons, Ltd, 2005.

Davis et al., "Designing Plasmonic Systems Using Optical Coupling between Nanoparticles," Phys. Rev. B—Condens. Matter Mater. Phys. 79, 155423, 2009.

Ditlbacher et al., "Silver Nanowires as Surface Plasmon Resonators," Phys. Rev, Lett. 95, 257403, 2005.

Ghenuche et al., "Spectroscopic Mode Mapping of Resonant Plasmon Nanoantennas," Phys. Rev. Lett. 101, 116805, 2008.

Iida et a l., "Development of Standard Samples with Programmed Defects for Evaluation of Pattern Inspection Tools," Proc. SPIE 10959, 109590J, 2019.

Jackson, "Classical Electrodynamics," Wiley, Inc., 1975.

Bhaduri et al., "Diffraction Phase Microscopy: Principles and Applications in Materials and Life Sciences," Adv. Opt. Photon. 6, pp. 57-119, 2014.

Kaiser et al., "Quantum Enhancement of Accuracy and Precision in Optical Interferometry," Light Sci. Appl. 7, pp. 17163-17163, 2018.

Cole et al., "Label-Free Single-Molecule Imaging with Numerical-Aperture-Shaped Interferometric Scattering Microscopy," ACS Photon. 4, pp. 211-216, 2017.

Liebel et al., "Ultrasensitive Label-Free Nanosensing and High-Speed Tracking of Single Proteins," Nano Lett. 17, pp. 1277-1281, 2017.

Ströhl et al., "Frontiers in Structured Illumination Microscopy," *Optica* 3, pp. 667-677, 2016.

Wu et al., "Faster, Sharper, and Deeper: Structured Illumination Microscopy for Biological Imaging," Nat. Methods 15, pp. 1011-1019, 2018.

Wang et al., "Combined Expansion Microscopy with Structured Illumination Microscopy for Analyzing Protein Complexes," Nat. Protoc. 13, pp. 1869-1895, 2018.

Mühlschlegel et al., "Resonant Optical Antennas," Science 308, pp. 1607-1609, 2005.

Vernon et al., "Influence of Particle-Substrate Interaction on Localized Plasmon Resonances," Nano Lett. 10, pp. 2080-2086, 2010.

Henn et al., "Maximum Likelihood Approach to the Inverse Problem of Scatterometry," Opt. Express 20, pp. 12771-12786, 2012.

Qin et al., "Deep Subwavelength Nanometric Image Reconstruction Using Fourier Domain Optical Normalization," Light Sci. Appl. 5, e16038, 2016.

Muthinti et al., "Characterization of E-Beam Patterned Grating Structures Using Mueller Matrix Based Scatterometry," J. Micro/Nanolitho., MEMS, MOEMS 12, 013018, 2013.

Medikonda et al., "Measurement of Periodicity and Strain in Arrays of Single Crystal Silicon and Pseudomorphic Si 1-x Ge x/Si Fin Structures Using x-Ray Recigrocal Space Maps," J. Vac. Sci. Technol. B 32, 021804, 2014.

Koo et al., "Detection of Coxiella burnetii Using Silicon Microring Resonator in Patient Blood Plasma," Micromachines 10, 427, 2019.

Postek et al., "Reference Material (RM) 8820: A Versatile New NIST Standard for Nanometrology," Raymond, C. Proc. SPIE 76381, 76381 B, 2010.

J. Shendure, S. Balasubramanian, G. M. Church, W. Gilbert, J. Rogers, J. A. Schloss, and R. H. Waterston, DNA sequencing at 40: past, present and future. Nature 550, 345 (2017).

Lin et al., "Opto-thermoelectric nanotweezers," Nat. Photon. 12, 195, 2018.

Yan et al., "Fabrication of a material assembly of silver nanoparticles using the ghase gradients of optical tweezers," Phys. Rev. Lett. 114, 143901, 2015.

Boettiger et al., "Super-resolution imaging reveals distinct chromatin folding for different egigenetic states," Nature 529, 418, 2016.

Xiao et al., "Giant switchable photovoltaic effect in organometal trihalide perovskite devices," Nat. mater. 14, 193, 2014.

Abbe, "Beiträge zurtheorie des mikroskops und der mikroskopischen wahrnehmung," Arch. Mikrosk. Anat. 9, 413, 1873.

Barsi et al., "*Nonlinear Abbe theory*" Nat. Photon. 7, 639, 2013.

Durant et al., "Theory of the transmission properties of an optical far-field superlens for imaging beyond the diffraction limit," J. Opt. Soc. A. B 23, 2383, 2006.

Liu et al., "Far-Field Optical Superlens," Nano Lett. 7, 403, 2007.

(56) References Cited

OTHER PUBLICATIONS

Liu et al., "Far-field optical hyperlens magnifying sub-diffraction-limited objects," Science 315, 1686, 2007.

Rogers et al., "A super-oscillatory lens optical microscope for subwavelength imaging," Nat. Mater. 11, 432, 2012.

Dong et al., "EEftheriades, Superresolution far-field imaging of complex objects using reduced superoscillating ripples," Optica 4, 1126, 2017.

Kozawa et al., "Superresolution imaging via superoscillation focusing of a radially polarized beam," Optica 5, pp. 86-92, 2018.

Shechtman et a l., "Optimal point spread function design for 3D imaging," Phys. Rev. Lett. 113, 133902, 2014.

Xie et al., "Harnessing the point-spread function for high-resolution far-field optical microscopy," Phys. Rev. Lett. 113, 263901, 2014.

Khurgin, "How to deal with the loss in plasmonics and metamaterials," Nat. Nanotechnol. 10, pp. 2-6, 2015.

Kabashin et al., "Plasmonic nanorod metamaterials for biosensing," Nat. Mater. 8, pp. 867-871, 2009.

Rodrigo et al., "Mid-infrared plasmonic biosensing with graphene," Science 349, 165, 2015.

Brolo, "Plasmonics for future biosensors," Nat. Photon. 6, pp. 709-713, 2012.

Regmi et al., "All-dielectric silicon nanogap antennas to enhance the fluorescence of single molecules," Nano Lett. 16, 5143, 2016.

Bakker et a l., "Magnetic and electric hotspots with silicon nanodimers," Nano Lett. 15, 2137, 2015.

Lekner, "TM, TE and 'TEM' beam modes: exact solutions and their problems," J. Opt. A: Pure Appl.

Lekner, "Polarization of tightly focused laser beams," J. Opt. A: Pure Appl. Opt. 5, 6, 2003.

Bendsøe et al., "Topology Optimization—Theory, Methods and Applications," Springer, Berlin, 2004.

Jensen et al., "Topology optimization for nano-photonics," Laser Photonics Rev. 5, 308, 2011.

Aage et al., "Giga-voxel computational morphogenesis for structural design," Nature 550, 84, 201bbh7.

Xu et a l., "Volume preserving nonlinear density filter based on Heaviside functions," Struct. Multidisc. Optim. 41, 495, 2010.

Schuck et al., "Improving the mismatch between light and nanoscale objects with gold bowtie nanoantennas," Phys. Rev. Lett. 94, 017402, 2005.

Mayergoyz et al., "Electrostatic (plasmon) resonances in nanoparticles," Phys. Rev. B 72, 155412, 2005.

Malitson, "Interspecimen comparison of the refractive index of fused silica," J. Opt. Soc. Am. 55, 1205, 1965.

Aspnes et al., "Dielectric functions and optical parameters of Si, Ge, GaP, GaAs, GaSb, InP, InAs, and InSb from 1.5 to 6.0 eV," Phys. Rev. B 27, 985, 1983.

McMeekin et al., "Refractive indices of proteins in relation to amino acid composition and specific volume," Biochem. Biophys. Res. Commun. 7, 151, 1962.

Makra et al., "A method based on light scattering to estimate the concentration of virus particles without the need for virus particle standards," MethodX 2, 91, 2015.

Gu, "Advanced optical imaging theory," Springer, Berlin, 1999.

Munro et al., "Calculation of the image of an arbitrary vectorial electromagnetic field," Opt. Express 15, 9293, 2007.

Zhu, Jinlong & Udupa, Aditi & Goddard, Lynford, "Visualizable Detection of Nanoscale Perturbations," 10:13140/RG.2.2.18384. 66569, Sep. 2019 (Preprint).

Roxworthy et al., "Application of plasmonic bowtie nanoantenna arrays for optical trapping, stacking, and sorting," Nano Lett. 12, 796, 2012.

Torok et al., "High numerical aperture vectorial imaging in coherent optical microscopes," Opt. Express 16, 507, 2008.

* cited by examiner

300

| | |
|---|---|
| Anisotropically excite a group of emitters. | <u>302</u> |

| | |
|---|---|
| Capture interference pattern in emitted radiation. | <u>304</u> |

| | |
|---|---|
| Reconstruct visual appearance. | <u>306</u> |

VISUALIZATION OF SUB-WAVELENGTH FEATURES

PRIORITY AND CROSS-REFERENCE TO RELATED APPLICATIONS

This application claims priority to U.S. Provisional Patent Application No. 63/036,215 filed Jun. 8, 2020, and titled Visualization of Sub-Wavelength Features, which is hereby incorporated by reference in its entirety.

This application is related to U.S. Provisional Patent Application Ser. No. 62/794,115, filed Jan. 18, 2019, which is hereby incorporated by reference in its entirety.

TECHNICAL FIELD

This disclosure relates to visualization of sub-wavelength features.

BACKGROUND

Rapid advances in nanotechnology, driven by ever increasing demands for compactness, efficiency, and versatility, have resulted in the widespread adoption of nanostructured devices. As one example, nanoparticle based display technologies have achieved widespread commercial success. Improved visualization and imaging of nanoscale systems will continue to increase production capabilities leading to even greater adoption.

DETAILED DESCRIPTION

Figure 1:
FIG. 1 shows an example visualization system.

The drawings are intended to present schematic, conceptual examples of the techniques and architectures discussed herein. The drawings are not intended necessarily to show scale or necessarily present other physical attributes (such as focusing angles. relative positions, shapes, appearances, or other physical attributes).

Light (e.g., electromagnetic radiation) may be characterized by a wavelength. In various implementations, a resolution limit for the system may be dependent on the wavelength of the light. Resolution limits may be defined in various contexts. One example is the Abbe resolution, which is defined as the wavelength of the light over two times a numerical aperture for a system. The Abbe resolution describes the smallest separation for which two different points can be resolved as different points. Points with separations smaller than the Abbe resolution for a system may appear merged (even under ideal focusing conditions).

Objects with separations/sizes smaller than the Abbe resolution (or other relevant resolution limit) may generate artifacts and/or perturbations when exposed to light (e.g., for the purpose of visualization, and/or other contexts). However, the signal strength of such perturbations may be low relative to scattering/transmission/refraction/reflection from other objects and background.

The techniques and architectures described herein use grouped emitters to generate visualization systems in which signal from structures with dimensions smaller than the resolution limit (including those with structures with a largest dimension below the resolution limit) exceed that from other nearby structures. In various implementations, light emitted from the grouped emitters while undergoing excitation produces a node (e.g., an area of destructive interference) in a spacing between the grouped emitters. Structures (e.g., samples such as objects within the spacing, defects in the emitters, the separation of the spacing itself, or other samples) may scatter the emitted light. This scattering may be captured due to the low background created by the node. Accordingly, the techniques and architectures may allow the visualization of samples such as: objects with one or more dimensions below the resolution limit, spacings with a width below the resolution limit, defects on a substrate or one or more of the grouped emitters or other samples. Two example ways to improve image resolution are to focus the incident light that excites the sample and to use an immersion objective lens. Light focusing allows one to perform confocal microscopy and improve the resolution by a small factor compared to wide field imaging. Immersion increases the numerical aperture relative to the value in air by the refractive index of the immersion material. However, because the method described herein uses wide field illumination and its achieved resolution does not depend on the objective's numerical aperture, not only are confocal imaging and immersion unnecessary (in some cases) but also an arbitrarily small numerical aperture objective can be used, thereby potentially offering a much larger field of view than even traditional wide field imaging. Accordingly, the techniques and architectures described herein may be used to visualize features that may be too small to resolve (even theoretically) using conventional optical imaging.

In various implementations, to create the node within the spacing, the grouped emitters may be anisotropically excited. For example, the excitation radiation may be anti-symmetric over a pair of grouped emitters. For example, the excitation radiation incident on a first of the grouped emitters may be opposite (e.g., shifted by $\pi$ radians) of the excitation radiation incident on a second of the grouped emitters. In some cases, the excitation radiation may be opposite in polarization direction. The excitation radiation may resonate with the emitters and be re-emitted as emitted radiation, which may differ in frequency from the excitation radiation. In some cases, the emitted radiation may maintain various characteristics of the excitation radiation, such that the emitted radiation remains anisotropic (e.g., the emitted radiation from the individual emitters may have different phase and/or polarization from that from others of the grouped emitters).

In an unperturbed state, the different emitted radiation characteristics may lead to the node within the spacing(s) between the grouped emitters. Thus, the introduction of samples (e.g., defects, relative shifts in spacing size across multiple cells of grouped emitters, objects, or other samples) may cause changes to the node which may be captured and analyzed to effect a visualization of the sample.

In various implementations, the excitation radiation may be absorbed and cause emission of the emitted radiation. In some cases, the absorption-emission process may reduce sensitivity of the system to the focal characteristics of the excitation radiation. In other words, the intensity distribution of the emitted radiation may be more strongly influenced by the shape and position(s) of the grouped emitters rather than the focal characteristics (e.g., spot focal size, focal angle, numerical aperture) of the excitation radiation beam or the collection characteristics (e.g., focal angle or numerical aperture) of the objective lens. Thus, the system may use a collimated illumination and a lower numerical aperture lens to collect the emitted radiation and resolve features smaller than that which is possible through conventional imaging with a higher numerical aperture lens because the system uses the grouped emitters to determine the distribution of the visualization radiation rather than the focal characteristics of the excitation radiation or the collection characteristics of the objective lens. Accordingly, the system may support sub-wavelength (sub-half-wavelength) visualization—including instances where the wavelength is scaled in accord with the refractive index of the ambient medium. Further, the system may support visualization of sub-wavelength (and/or below resolution limit) features whether the wavelength of excitation radiation or the wavelength of the emitted radiation is used as the reference wavelength for evaluation.

FIG. 1 shows an example visualization system 100. The visualization system may include a substrate 110 with grouped emitters 120 disposed thereon. The grouped emitters 120 may be formed via various nanofabrication techniques including those compatible with complementary metal-oxide semiconductor (CMOS) and III-V fabrication processes. A spacing 122 may be present between the grouped emitters 120.

In the example visualization system 100, the grouped emitters include a pair of emitters. However, other groupings (e.g., 3, 4, 5, 6, . . . , n) of emitters may be used.

As discussed above, the individual grouped emitters 120 may be positioned on the substrate and shaped to generate emitted radiation that interferes with that generated by the other ones of the grouped emitters within the spacing. The interference may cause a node 124 within the spacing where the inference is destructive and thus the field intensity of the emitted radiation is lower than that outside the node 124. In some cases, the node 124 may cover the entire spacing 122. In some cases, the node 124 may cover a portion of the spacing 122. In some cases, the node 124 may extend beyond the spacing. Further, the inference pattern may be shaped such that the node extends beyond the spacing to ensure that the field is low/zero and uniform over the entire spacing. In some cases, the radiation emitted by an on one side of an individual emitter is phase-shifted by π radians with respect to that generated on the other side of the emitter. Accordingly, the emitted radiation from an individual emitter may destructively interfere with emitted radiation from others of the grouped emitters on the side of the emitter facing the spacing. Conversely, the emitted radiation from an individual emitter may constructively interfere with emitted radiation from others of the grouped emitters on the side of the emitter facing away from the spacing. Accordingly, in some implementations, such discontinuity results in a well-defined node within the spacing that abruptly ends for areas not between the emitters.

In various implementations, to create the destructive interference within the spacing 122, the grouped emitters may be driven (e.g., exposed to excitation radiation) asymmetrically. For example, excitation radiation incident on the grouped emitters may be anisotropic. For example, the excitation radiation incident on the may have different zones with different phases. In an illustrative example, excitation radiation incident may be incident on a pair of emitters and have two zones shifted by π relative to one another. In another example, the excitation radiation may have n zones, with successive 2π/n phase shifts for n emitters. In some implementations, the excitation radiation may have different polarization zones. In some cases, polarization may be preserved (or reflected) across zones.

The zones may have antisymmetric (relative to one another) E-field components. The zones may be antisymmetric across one, two, or three dimensions.

In various implementations, as discussed above, a sample 130 may be present within the spacing. The sample may be characterized by a sample dimension, which in some cases, may be the largest dimension of the sample. In various implementations, visualizations may be supported for ranges of sample dimensions that start from a size hundreds or thousands of times smaller than the wavelength up to ranges that end at multiple times larger than the wavelength of the emitted radiation. As a illustrative example, a visualization system may support visualization for samples ranging from a twelfth of the wavelength of the emitted radiation up to samples with dimensions twice wavelength of the emitted radiation. Other ranges may be supported, including ranges that support visualization of arbitrarily small sample dimensions.

In some cases, the arrangement of the grouped emitters may be determined using E-field simulations to determine an arrangement that provides features such as a node of a target size, a direct visualization (i.e., one that can be viewed by eye without any computational reconstruction), a computationally simple visualization reconstruction, a reconstruction that can be performed more accurately than those of the competing cell arrangement, or other features.

Further, as discussed above, samples may include defects in the emitters, relative shifts in spacing size across multiple cells of grouped emitters, objects, and/or other samples.

In various implementations, referring to FIG. 1, the grouped emitters 120 may form a cell 180 within an array 190 of grouped emitter cells (e.g., 180, 181, and 182). The cells of the array may form a detection area 190 (e.g., for defects, small particles, and/or other samples) that extends over the multiple cells. In some cases, the cells may provide control and test groupings for characterizing defects, spacing width, and/or other structural characteristics of the grouped emitters themselves. The cells may be uniform or non-uniform. For example, the cells may differ in number of grouped emitters, spacing size, emitter shape, cell shape, and/or other features.

The array may be arranged in repeating or non-repeating layouts. In some cases, the cell shapes within the array may be a single tessellating shape or multiple different shapes that together tessellate (e.g., shown as 190 in FIG. 1).

In some cases, non-tessellating cell arrangements may be used. For example, a cell arrangement with more aggregate visualization area (e.g., within spacings within cells) may be selected over an arrangement that tessellate (e.g., an arrangement with little or no space between cells).

In some cases, the cells of the array may be used in concert to visualize portions of a larger structure. In some cases, one or subgroups of cells of the array may work in concert while other cells visualize different and/or unrelated samples.

The individual grouped emitters may have various shapes. For example, the emitters may be shaped as nano-photonic antennas, nanowires, dimers, trimers, and/or other shapes. In an illustrative example, a group of at least two rectangular nanowires may serve as the grouped emitters. In some cases, the excitation radiation may be polarized along the length of the nanowires. In some cases, the nanowires may be fabricated from a metallic material such as gold.

In various implementations, the emitters may be fabricated out of various materials including metals, glasses, dielectrics, (doped) semiconductors, polymers, organic/biological materials, or other resonant materials. The emitters may utilize one or more of various structures including microfluidic channels nanoresonators, nano-photonic antennas, nanowires, dimers, trimers, and/or other resonant structures.

Figure 2:
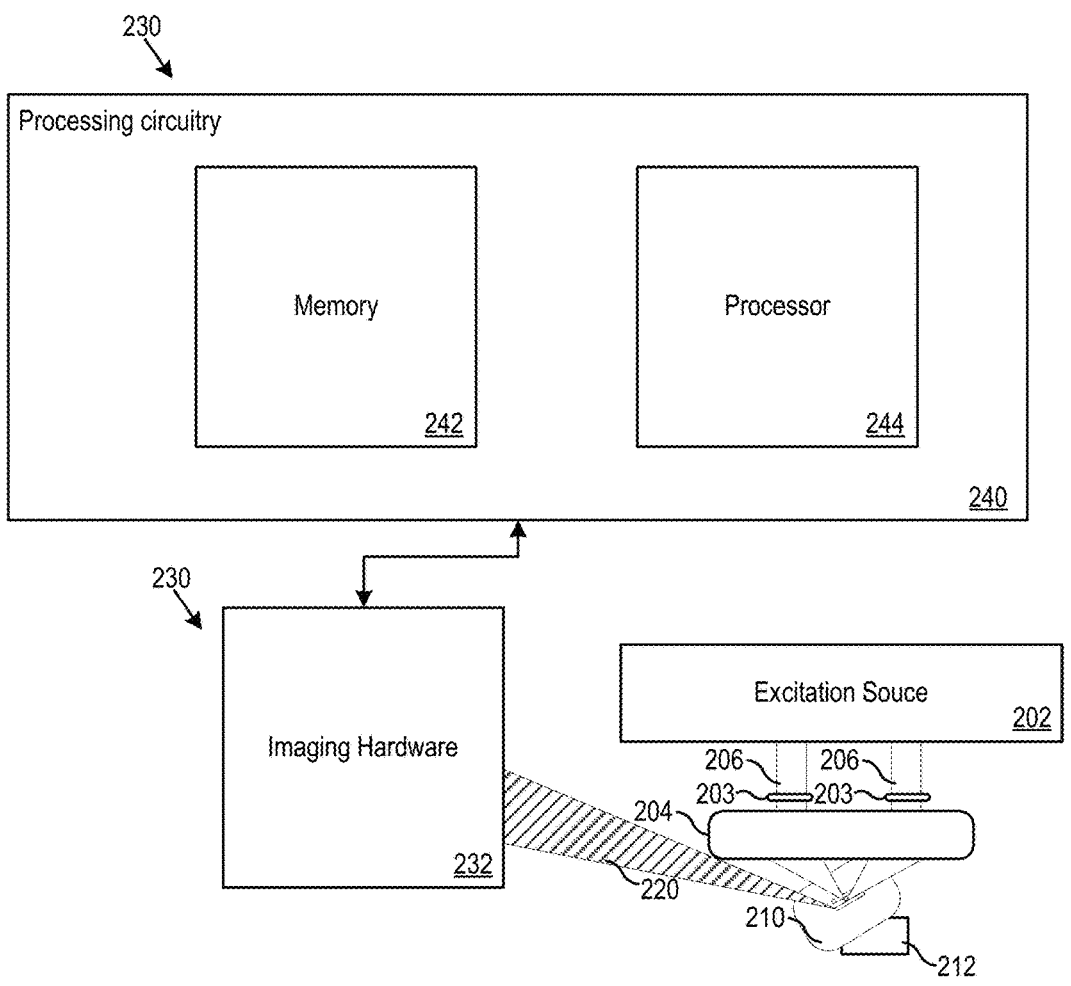
FIG. 2 shows an example visualization device.

FIG. 2 shows an example visualization device 200. The visualization device 200 may include an excitation source 202, one or more polarizers 203 and a beam combiner 204 to support an anisotropic irradiation profile, and a visualization platform 210, such as the example visualization system 100, or other visualization platform hosting one or more groups of emitters. The visualization device 200 may include a capture system 230, which may include imaging hardware 232 (such as a camera) to capture the output interference pattern generated by the visualization platform 210 upon exposure to the excitation radiation. In FIG. 2, the relative scale of the emitter on the visualization platform is enlarged for the purposes of illustration. As discussed above, the scale of the emitters and spacing may be around that of or below the scale of the wavelength of the emitted radiation 220. The capture system 230 may further include processing circuitry 240, which may include a memory 242 and a processor 244, to analyze or store a direct visualization image or to perform a computational reconstruction of the visualization based on the output interference pattern.

The visualization platform 210 may further include positioning hardware 212 such as translation and/or rotation stages, piezos, and/or other positioning devices. The positioning hardware 212 may be used to ensure that the position of the grouped emitters aligns with the anisotropic irradiation profile of the excitation source 202.

In various, implementations, the excitation source 202 may feed multiple arms 206, which may have different polarizer incidence, path length, or other differences in beam path. The differing arms 206 may be recombined to generate the anisotropic irradiation profile incident on the visualization platform 210 (e.g., through generation of an interference pattern). The arms may include free-space arms and/or waveguided (e.g., fiber-coupled) arms. The arms may be focused using a topology-optimized lens to generate an inference pattern.

In some cases, the arms may be generated using a beam splitter, such as a fiber-based or free-space polarization beam splitter or partial reflection beam splitter (such as a pellicle). In some cases, the arms may be created by splitting off a portion of a beam spatially. For example, a beam may be halved, a center portion may be removed (creating a hollow beam and center portion), or other spatial splitting techniques may be used.

The excitation source may be setup for darkfield or brightfield illumination of the emitters. In some cases, darkfield illumination may result in little or no excitation radiation being captured by the capture system 230. In some cases, the relative reduction (compared to brightfield illumination) of captured excitation radiation may lead to corresponding relative reduction in background captured by the capture system 230. In some cases, such a reduction may improve Signal-to-Noise (SNR) for the captured images (prior to visualization reconstruction).

The relative path length (or other path differences) of the arms may be adjusted to adjust the anisotropic irradiation profile incident on the visualization platform 210. The adjustment may result in changes in fringe spacing, anti-symmetry of E-field elements, emitter resonance levels, polarization angle, polarization type, incidence angle, and/or fringe phase which can each change the position of anisotropic zones and/or the size of such zones. In some cases, frequency/phase tuning of the excitation source may be used to execute such anisotropic zones adjustment.

In some implementations, the excitation source may be resonance-tuned to a sub-set of cells in array grouped emitters and/or individual emitters within a group. In some cases, this may allow packing of objects (or grouped emitters) nearby one another but prevent interference or crosstalk between selected emitters within the group. In some cases, a sample nearby the group of objects with different resonances may be visualized using interference patterns generated by sweeping or otherwise tuning to the multiple difference resonances of the group of objects.

In some implementations, positioning of the visualization platform may be used in conjunction with excitation source/path tuning to position and size the anisotropic zones. In some cases, positioning of the visualization platform may serve a "coarse" correction while excitation source/path tuning may serve as "fine" correction.

The visualization device 200 may further include an optic 208 (such as an objective lens) to focus the excitation radiation on the visualization platform 210.

The excitation source 202 may include a laser source or other coherent light source. The excitation source 202 may be tunable across phase and/or frequency. In some cases, a continuum source (such as a super-continuum source) may be used. In some cases, a continuum source may be filtered to select a particular frequency band (e.g., a narrow band-pass filter may be used). In some cases, a filter with a tunable pass band may be used.

Figure 3:
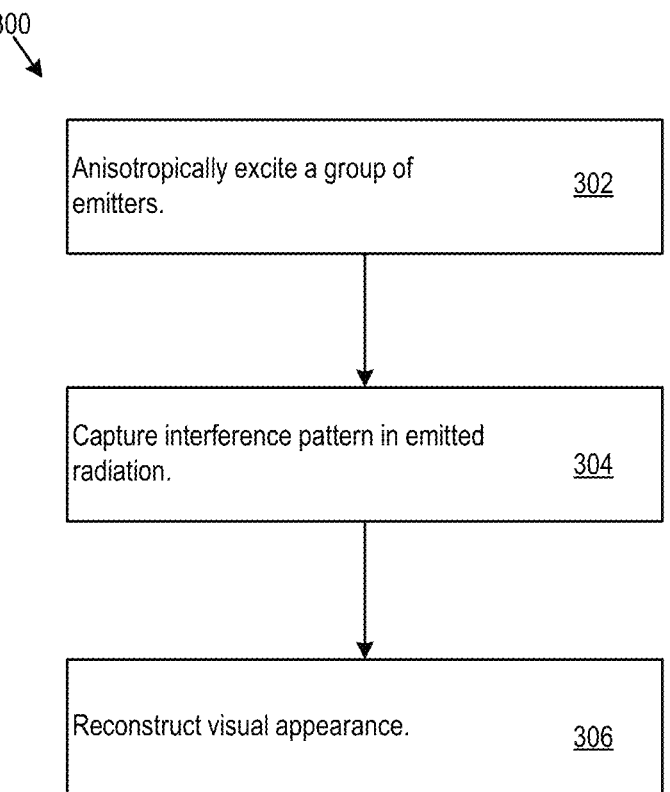
FIG. 3 shows an example visualization method.

FIG. 3 shows an example visualization method 300. The method may include anisotropically exciting a group of emitters (302). As discussed above, the excitation may be multi-zoned and may have varying phase, polarization, and/or symmetry across the zones. In some cases, the excitation may be anti-asymmetric across the emitters in the group. Further, as discussed above, the excitation may be tuned over various characteristics.

Responsive to a sample (which may include the emitters or a characteristic of the emitters themselves), the emitters may produce an interference pattern from their emitted radiation upon exposure to the excitation radiation. The method may include capturing the interference pattern present in the emitted radiation (304).

In various implementations, the system may be static in time. In other words, the sample state, excitation conditions, and/or emitter conditions may be unchanged over a timescale in which less-than-real-time visualization reconstruction may provide insight into the condition of the system at the time the visualization reconstruction completes.

In some implementations, the system may be dynamic. In other words, the system may have changed state by the time a less-than-real-time visualization reconstruction has completed. Accordingly, in some cases, the system may be configured to provide a direct visualization such that no computational reconstruction is needed and real-time visualization is achieved. In other cases, this direct visualization may not be readily available and/or possible. In some cases, real-time reconstruction may be used.

The method may further include reconstructing a visual appearance of the sample (306). In some cases, a reference pattern generated by the exposed grouped emitters in the absence of the sample may be used in the reconstruction process. In various implementations, the reconstruction process may include capturing interference patterns from one or more known (e.g., purposefully constructed) samples. The "fingerprints" from the known samples may be used for machine-learning (ML) training. The trained system may be used to perform visualization reconstructions on unknown samples.

In various implementations, deep learning neural networks (DNNs) may be used to perform the ML-process. In some cases, image transformation specialized DNNs may be used. For example, convolution neural networks (e.g., U-Net), graph neural networks, and/or other neural networks may be used. In some implementations, an EfficientNet neural network may be used. The EfficientNet neural network may perform image transformations in a blockwise manner reducing overall processing load relative to other DNNs without image-transform-specific processing structures.

In some implementations, a transfer learning process may be used for the training of the neural network. The transfer learning process may include transferring one or more layers (such as hidden layers) from a pre-trained neural network. In some cases, the pre-trained neural network may be pre-trained in general image transformations (e.g., a wide swath of image transforming tasks—e.g., scaling, colorizing, blurring, interpolating, object identification, Fourier transforming, and/or other tasks). The use of transfer learning may reduce the relative number of training samples needed to train the neural network.

Figure 4:
FIG. 4 shows an example excitation source.
Figure 4:
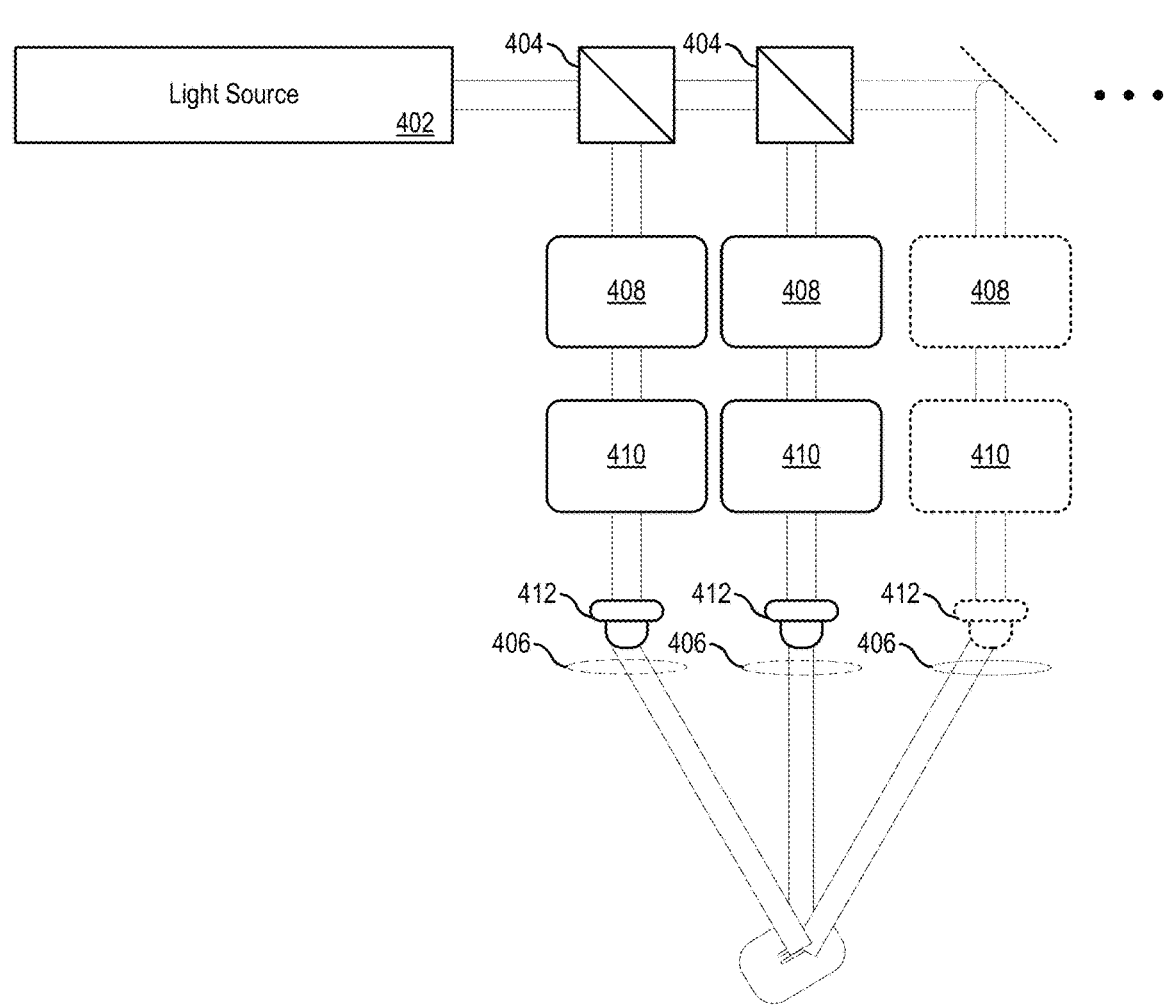

FIG. 4 shows an example excitation source 400. The excitation source may include a coherent light source 402, a splitter 404, two or more output ports 406 with corresponding mechanical mounts 408, corresponding polarization controllers 410, and corresponding lenses 412. Output beams from the output ports 406 may be combined and interfered to generate an anisotropic irradiation profile on a visualization system/platform (e.g., 100, 210). The lenses 412 may be adjusted to control the beam diameters for the corresponding output ports 406. The polarization controllers 410 may control the ellipticity and direction of the major axis of the local polarization in the resultant anisotropic irradiation profile. The pitch, yaw, and/or roll rotational axes and/or the three translational degrees of freedom of the mechanical mounts 408 may be used to control the spatial profile of the resultant anisotropic irradiation profile by changing an incidence angle, path length, or other spatial characteristic of the paths. The example excitation source may include fiber coupled and/or free-space components. The coherent light source 402 may have tunable phase and/or frequency capabilities.

Figure 5:
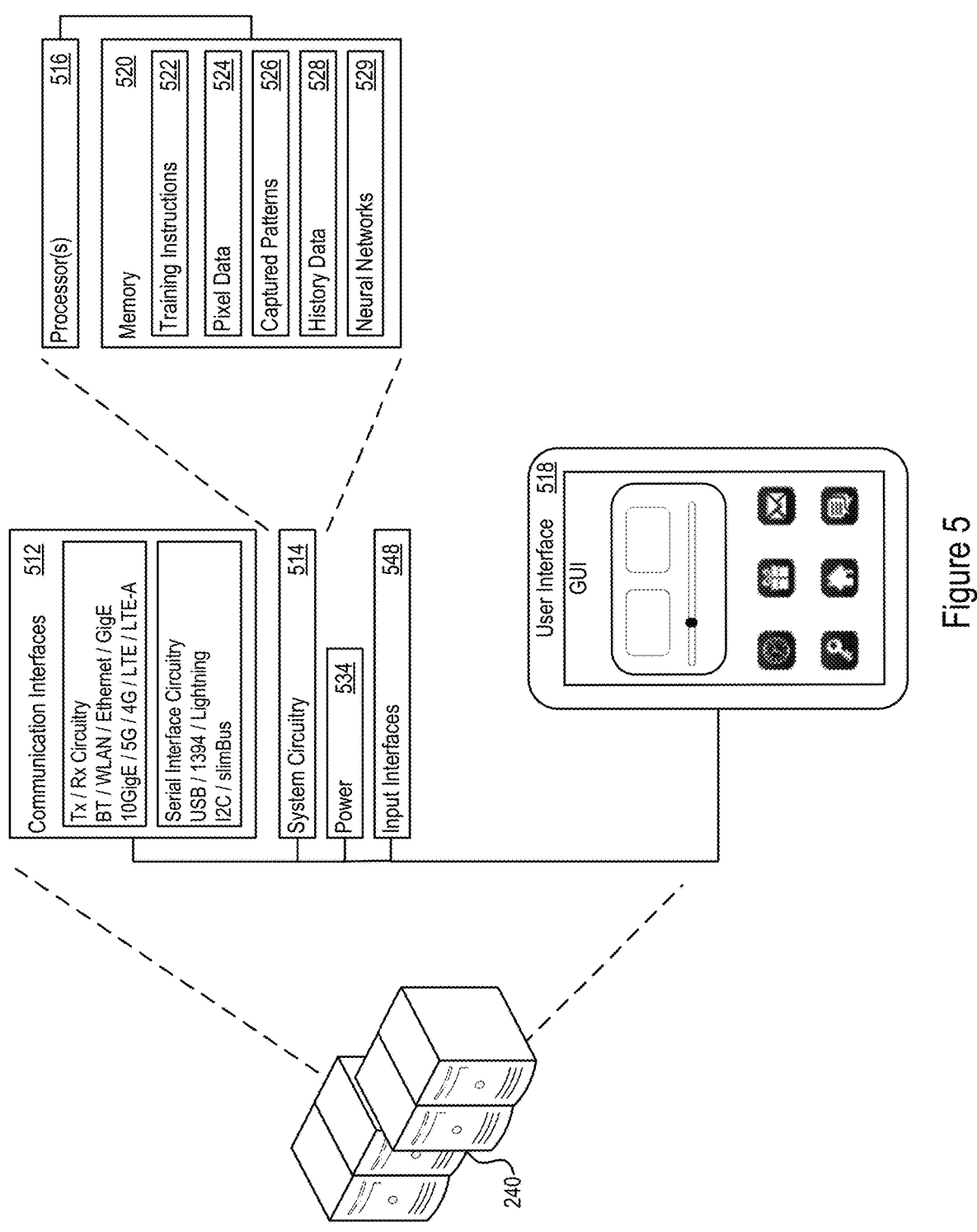
FIG. 5 shows example processing circuitry.

FIG. 5 shows example processing circuitry (PrC) 240, which may provide an execution environment for reconstruction of visualizations and/or DNN training. The PrC 240 may include system circuitry 514 to support tasks such as reconstruction of visualizations and/or DNN training (or other machine learning protocols for image transformation). The system circuitry 514 may include processors 516 (such as graphic processing units (GPUs)), memory 520, and/or other circuitry.

The memory 520 may be used to store training instructions 522, pixel data 524, captured inference patterns 526, history data 528, neural networks 529, or other data.

The PrC 240 may also include one or more communication interfaces 512, which may support wireless, e.g. Bluetooth, Wi-Fi, WLAN, cellular (3G, 4G, LTE/A, 5G), and/or wired, ethernet, Gigabit ethernet, optical networking protocols. The communication interfaces 512 may support communication as network interface circuitry. The PrC 240 may include power management circuitry 534 and one or more input interfaces 548. The PrC 240 may be implemented on localized hardware or distributed or partially distributed (e.g., cloud-based) hardware platforms.

The PrC 240 may also include a user interface 518 that may include man-machine interfaces and/or graphical user interfaces (GUI). The GUI may be used to present interfaces and/or representations of visualizations, DNN training options, and/or other user information and interfaces.

The methods, devices, processing, and logic described above and below may be implemented in many different ways and in many different combinations of hardware and software. For example, all or parts of the implementations may be circuitry that includes an instruction processor, such as a Graphics Processing Unit (GPU), Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Examples are listed in Table 1.

TABLE 1

Examples

1. A device including:
a substrate;
grouped emitters disposed on the substrate, a spacing between the grouped emitters below a
    resolution limit of emitted radiation from the emitters, the grouped emitters positioned to
    generate destructively interfering radiation within the spacing when:
        a first of the grouped emitters is driven by excitation radiation of a first phase; and
        a second of the grouped emitters is driven by excitation radiation of a second phase
            different from the first phase.
2. The device of example 1, where the resolution limit for the emitted radiation is half of the
    wavelength of the emitted radiation.
3. The device of either of examples 1 or 2, where the first phase is the opposite of the second
    phase, where, optionally the first phase corresponds to the second phase shifted by $\pi$ radians.
4. The device of any of examples 1-3, further including a sample within the spacing, where the
    sample causes a change to an interference pattern that occurs when:
        the first of the paired emitters is driven by excitation radiation of the first phase; and
        the second of the paired emitters is driven by excitation radiation of the second phase
            different from the first phase, where:
                optionally, the change may be modelled as a perturbation to the interference
                    pattern;
                optionally the sample has a sample dimension less than the resolution limit;
                optionally the sample has a sample dimension less than a twelfth of the
                    wavelength of the emitted radiation; and
                optionally the sample dimension is the largest dimension of the sample.
5. The device of any of examples 1-4, where:
the grouped emitters form a first cell; and
the device further include an array of cells including the first cell, the array forming a
    detection area, where:
        optionally, the cells are repeating, deterministic, and/or uniform in structure; and
        optionally, the cells are arranged in a tessellating pattern, for example, in some cases,
            the pattern may be non-repeating and/or non-deterministic but may still tessellate;
        optionally, the pattern may be determined using a computational analysis of E-field
            standing waves to determine: the pattern offering the largest area with which to
            visualize forms, the pattern offering the least computationally complex visualization
            reconstruction, and/or a balance between the two;
        optionally, the grouped emitters may form one cell where other grouped emitters are in
            neighboring cells, the grouped emitters in each cell allowing visualization of objects
            within that cell, where the array as a whole allows imaging over the space occupied
            by the array.
6. The device of any of examples 1-5, where the grouped emitters include a pair of rectangular
    nanowires, where:
        optionally, the spacing is between 4 nanometers and 1600 nanometers;
        optionally, the spacing is between a two-hundredth of the wavelength of the emitted
            radiation and two times the wavelength of the emitted radiation;
        optionally, the rectangular nanowires are between 100 nanometers and 100 microns
            long;
        optionally, the rectangular nanowires are between 4 nanometers and 1600 nanometers
            tall;
        optionally, the rectangular nanowires are between 4 nanometers and 1600 nanometers
            wide;
        optionally, the nanowires are coated with a metal such as gold; and
        optionally, the excitation radiation is polarized along the length of the nanowires.
7. The device of any of the examples 1-6, where the spacing is between a two-hundredth of the
    wavelength of the emitted radiation and twice the wavelength of the emitted radiation.
8. The device of any of the examples 1-7, where the excitation radiation is polarized to achieve
    the first phase incident on the first of grouped emitters, and the second phase incident on the
    second of the grouped emitters.
9. The device of any of the examples 1-7, where:
optionally, all of the grouped emitters operate in concert to generate the interference pattern
    used to visualize a sample; and
optionally, grouped emitters work as at least partially independent subgroups, such as pairs,
    within the group
10. A device comprising:
a polarizer;
an excitation source;
a visualization platform, including a group of objects that are anti-symmetrically excitable
    when exposed to excitation radiation from the excitation source.
11. The device of example 10, including any of the features of examples 2-9, where the
    visualization platform replaces the substrate and grouped emitters.
12. The device any of examples 1-11, where the device further includes a translation stage
    (or rotation, multi-axis, or other stage) to position the visualization platform or the source
    such that the group of objects (or grouped emitters) are anti-symmetrically excited by the
    excitation radiation, where anti-symmetric excitation includes the objects being excited such
    that an interference pattern is formed with at least some destructive interference, where:
        optionally translation of the source include translating or changing the angle of one of
            multiple interfering sources to adjust its phase or the resulting fringe spacing, the
            fringes generated by the multiple interfering sources; and TABLE 1-continued Examples optionally relative motion of the sample and the intensity nulls can be achieved by
        tuning the laser wavelength or by phase shifting one of two interfering beams either
        while the light is in the fiber or when it is in free space.
13. The device of any of examples 1-12, where an objective is used to image the
    visualization platform, and/or expose the group of objects to excitation radiation from the
    source.
14. The device of any of examples 1-13, where the polarizer is selected to produce
    excitation radiation that drives anti-symmetric emitted radiation from the group of objects
    (or grouped emitters) that has anti-symmetric E-field components in at least one-dimension,
    optionally at least two dimensions, optionally, at least three dimensions.
15. The device of any of examples 1-14, where the excitation source further includes
    wavelength tuning capability to adjust the anti-symmetry of the excitation, and/or the
    resonance level of at least some of the objects (or grouped emitters), where:
        optionally, a subset of the group of objects may be activated by tuning to a resonance
            of the subset [In some cases, this may allow packing of objects (or grouped emitters)
            nearby one another but prevent interference or crosstalk between selected emitters
            within the group. In some cases, a sample nearby the group of objects with different
            resonances may be visualized using interference patterns generated by sweeping or
            otherwise tuning to the multiple difference resonances of the group of objects];
        optionally, where the source includes a tunable laser, or other tunable coherent source;
        optionally, the source includes a continuum source;
        optionally, the source includes a super-continuum source;
        optionally, the super-continuum source includes at least an octave-spanning continuum
            source, such that excitation by a fundamental and a second harmonic is possible; and
        optionally, the source includes a filter to pick out one or more excitation lines from a
            broader bandwidth source (e.g., continuum, super-continuum, octave-spanning, or
            other broader bandwidth source); and
        optionally, the filter includes a tunable filter.
17. The device of any of examples 1-16, where the objects (or grouped emitters) include
    nanostructures, such as nanowires, nano-antennas, dimers, trimers, microfluidic channels,
    nanostructures with specific resonance lines, or other nano-optic objects, where:
        optionally, the nanostructures include a metallic material;
        optionally, the nanostructures include a dielectric material;
        optionally, the nanostructures include a glass material;
        optionally, the nanostructures include a (doped) semiconductor material;
        optionally, the nanostructures include a III-V material;
        optionally, the nanostructures include a polymer or a chemical molecule; and
        optionally, the nanostructures include a biological material.
16. A method including:
visualizing a sample by:
    anti-symmetrically exciting grouped emitters (or a group of objects) proximate to the
        sample;
    capturing an interference pattern generated by the grouped emitters; and
    reconstructing a visual appearance of the sample, while referencing a pattern generated
        by the grouped emitters when excited in the absence of the sample.
17. The method of example 16, where visualizing the sample includes performing below-
    resolution-limit imaging.
18. The method of example 16 or 17, where visualizing includes imaging appearance
    details below half of the wavelength in dimension.
19. The method of any of examples 16-18, where anti-symmetrically exciting the grouped
    emitters includes causing the grouped emitters to produce anisotropic polarized radiation.
20. The method any of examples 16-19, where the sample is disposed between or in
    proximity to at least a first and second of the grouped emitters, where:
optionally, the sample is disposed near an interference node caused by anti-symmetric
    emission from the grouped emitters.
21. The method of any of examples 16-20, where anti-symmetrically exciting grouped
    emitters includes tuning a source, wavelength, relative position, relative incidence angle,
    path length, phase, polarization angle, polarization type, or any combination thereof.
22. The method of any of examples 16-21, where reconstructing a visual appearance
    includes performing a computational reconstruction.
23. The method of any of examples 16-21, where instead of visualizing the sample,
    determining the presence of multiple grouped emitters (versus just a single emitter) based on
    the presence of interference fringes, further no reconstruction necessarily need be performed.
24. The method of any of examples 16-21, performed using the device of any of examples
    1-15, where:
        optionally, one or more steps are added to the method to implement any of the features
            or any combination of features of the device.
25. A method of imaging including:
generating an at least partially anti-symmetric excitation state for at least two objects and
    capturing at least one image of the light radiated by said objects.
26. The method of example 25, where the at least partially anti-symmetric excitation is
    generated by the interference of the fields from at least two optical beams, the focused fields
    from a topology-optimized lens, or the central region of a hollow optical beam, or any
    combination thereof.
27. The method of either of examples 25 or 26, where the positions of the objects and the
    properties of the excitation are static in time.
28. The method of any of examples 25-27, where the centroid position of the objects is
    translated.

TABLE 1-continued

Examples

29. The method of any of examples 25-28, where the optical properties of the excitation are varied by changing the wavelength, incidence angle, phase, or polarization of the source.
30. An apparatus for generating a desired at least partially anti-symmetric excitation state; the apparatus consisting of a laser, a beam splitter with at least two output ports, and a polarization controller, lens, and mechanical mount for each of the output ports; and
    interfering at least two of the output beams to create an interference pattern;
    adjusting each lens to control the spot size of the corresponding beam;
    adjusting the polarization controller to control the ellipticity and direction of the major axis of the local polarization in the interference pattern; and
    adjusting the pitch, yaw, and roll rotational axes and the three translational degrees of freedom of each mechanical mount to control the spatial profile of the interference pattern.
31. The apparatus of example 30, where the laser is a fiber-coupled laser.
32. The apparatus of example 30, where the laser is a free-space laser.
33. The apparatus of example 30, where the laser is a single-mode single-wavelength laser.
34. The apparatus of example 30, where the laser is a tunable or swept-wavelength laser.
35. The apparatus of any of examples 30-34, where the beam splitter is fiber-coupled.
36. The apparatus of any of examples 30-34, where the beam splitter is a free-space splitter.
37. The apparatus of any of examples 30-36, where the polarization controller is fiber-based.
38. The apparatus of any of examples 30-37, where the polarization controller consists of a rotatable linear or circular polarizer.
39. The apparatus of any of examples 30-38, where the mechanical mount includes a scanning galvanometer to control the pitch and yaw of the beam.
40. A device comprising a source including includes tuning capability to adjust an anti-symmetry of an excitation of grouped emitters, where:
    optionally, the device includes any of the features or any combination of features of any of examples 1-24;
    optionally, the tuning capability is a wavelength tuning capability;
    optionally, the tuning capability is a path length tuning capability;
    optionally, the tuning capability is a phase tuning capability;
    optionally, the tuning capability is a resonance level tuning capability;
    optionally, the tuning capability is effected by translating a source;
    optionally, the tuning capability is effected by changing the path length of one of multiple interfering sources relative to that of the other sources.
41. A product including a device resulting from implementation of any of the methods of examples 25-29.

Various implementations have been described and other implementations are possible.

The invention claimed is:

1. A device including:

a substrate;

grouped emitters disposed on the substrate;

wherein:

the substrate comprises a spacing between the grouped emitters, a width of the spacing is below a resolution limit of emitted radiation from the emitters; and a destructive interference area located within the spacing to create an electromagnetic canyon, wherein the grouped emitters are positioned to generate destructively interfering radiation within the destructive interference area when the grouped emitters are anisotropically excited, wherein:

a first emitter of the grouped emitters is driven by excitation radiation with a first phase; and a second emitter of the grouped emitters is driven by the excitation radiation with a second phase different from the first phase.

2. The device of claim 1, the first phase corresponds to the second phase shifted by π radians.

3. The device of claim 1, further including a sample within the spacing, where the sample causes a change to an interference pattern that occurs when:

the first of the grouped emitters is driven by excitation radiation with the first phase; and the second of the grouped emitters is driven by excitation radiation with the second phase different from the first phase.

4. The device of claim 3, where:

the sample has a sample dimension less than the resolution limit; and the sample dimension is the largest dimension of the sample.

5. The device of claim 1, where:

the grouped emitters form a first cell; and the device further includes an array of cells including the first cell, the array forming a detection area.

6. The device of claim 5, where the cells are arranged in a tessellating pattern.

7. The device of claim 1, where the grouped emitters include a pair of rectangular nanowires.

8. The device of claim 7, where the excitation radiation includes radiation polarized along a length of the nanowires.

9. The device of claim 1, where the width of the spacing between the grouped emitters is less than twice a wavelength of the emitted radiation.

10. The device of claim 1, where the excitation radiation includes radiation polarized to achieve the first phase incident on the first emitter of the grouped emitters, and the second phase incident on the second of the grouped emitters.

11. The device of claim 1, wherein:

the first emitter and the second emitters are positioned to:

when the first emitter is driven by the excitation radiation with the first phase, and the second emitter is driven by the excitation radiation with the second phase different from the first phase:

generate destructively interfering radiation within the spacing when no sample is present and, generate an interference pattern within the spacing when a sample is present within the spacing.

12. The device of claim 1, wherein:

the width of the spacing is between a two-thousandth of a wavelength of the emitted radiation and twice a wavelength of the emitted radiation.

13. A device including:

a substrate;

a first nanowire emitter disposed on the substrate;

a second nanowire emitter disposed on the substrate, the second nanowire paired to the first nanowire;

a spacing between the first and second nanowire emitters to receive a sample, wherein a width of the spacing is below a resolution limit of emitted radiation from the first and second nanowire emitters; and a destructive interference area located within the spacing to create an electromagnetic canyon, wherein the first and second nanowire emitters positioned to:

when the first nanowire emitter is driven by excitation radiation having an anisotropic irradiation profile with a first phase, and the second nanowire emitter is driven by the excitation radiation with a second phase different from the first phase:

generate destructively interfering radiation within the destructive interference area within the spacing when no sample is present and generate an interference pattern within the spacing when a sample is present within the spacing.

14. The device of claim 13, where the excitation radiation includes radiation polarized along a length of the first and second nanowire emitters.

15. The device of claim 13, where the width of the spacing is between a two-thousandth of a wavelength of the emitted radiation and twice a wavelength of the emitted radiation.

* * * * *